(12) United States Patent
Hayashida

(10) Patent No.: US 8,365,546 B2
(45) Date of Patent: Feb. 5, 2013

(54) HOT WATER STORAGE TYPE HOT WATER SUPPLY SYSTEM AND OPERATION METHOD OF THE SAME

(75) Inventor: Gaku Hayashida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/381,452

(22) PCT Filed: Jul. 6, 2011

(86) PCT No.: PCT/JP2011/003850
§ 371 (c)(1),
(2), (4) Date: Dec. 29, 2011

(87) PCT Pub. No.: WO2012/004985
PCT Pub. Date: Jan. 12, 2012

(65) Prior Publication Data
US 2012/0186278 A1   Jul. 26, 2012

(30) Foreign Application Priority Data

Jul. 7, 2010   (JP) .................................. 2010-154564

(51) Int. Cl.
*F25D 17/00* (2006.01)
(52) U.S. Cl. ............... 62/259.2; 62/79; 62/181; 62/185; 62/201; 236/1 C
(58) Field of Classification Search ............... 62/79, 181, 62/13, 185, 201, 259.2; 236/1 C, 91 D
See application file for complete search history.

(56) References Cited

U.S. PATENT DOCUMENTS

2009/0249802 A1 * 10/2009 Nemesh et al. ................... 62/56

FOREIGN PATENT DOCUMENTS

| JP | 08-138761    | 5/1996  |
|----|--------------|---------|
| JP | 2004-239510  | 8/2004  |
| JP | 2005-164124  | 6/2005  |
| JP | 2009-143509  | 7/2009  |
| JP | 2009-266556  | 11/2009 |
| JP | 2010-002083  | 1/2010  |
| JP | 2010-007953  | 1/2010  |
| JP | 2010-050000  | 3/2010  |

* cited by examiner

*Primary Examiner* — Cheryl J Tyler
*Assistant Examiner* — Jonathan Bradford
(74) *Attorney, Agent, or Firm* — Greenblum & Bernstein, P.L.C.

(57) ABSTRACT

A hot water storage type hot water supply system includes a storage battery unit, a heat pump cycle, a water storage tank, a water circulation path, first and second paths, first and second temperature sensors, and a controller. The heat pump cycle circulates a first refrigerant. The first and second paths circulate a second refrigerant. The first and second sensors sense temperatures of the storage battery unit and water stored in the tank, respectively. The controller controls the second refrigerant to flow in the first or the second path when the temperature of the storage battery unit sensed by the first sensor is higher or lower than a first or a second predetermined temperature, respectively. The controller controls to close the first and second paths when the temperature of the storage battery unit sensed by the first sensor is not lower than the second predetermined temperature and not higher than the first predetermined temperature.

8 Claims, 4 Drawing Sheets

HOT WATER STORAGE TYPE HOT WATER SUPPLY SYSTEM AND OPERATION METHOD OF THE SAME

CROSS-REFERENCE TO RELATED APPLICATIONS

The present application is a U.S. National Phase of International Application PCT/JP2011/003850, filed Jul. 6, 2011, the entire disclosure of which is expressly incorporated by reference herein.

TECHNICAL FIELD

The present invention relates to a hot water storage type hot water supply system and an operation method of the system. In particular, the invention relates to a control of a storage battery unit so as to improve charge-discharge efficiency thereof and efficiency of the system equipped with the unit.

BACKGROUND ART

To date, a variety of systems have been introduced which utilize a combination of a heat pump cycle and a secondary battery that charges and discharges for system electric power. However, it is known that, in general, charge-discharge characteristics of the secondary battery are greatly influenced by temperature of the secondary battery itself. Thus, a system has been disclosed which utilizes heat generated by a heat pump in order to adjust the temperature of the secondary battery to an appropriate temperature (Patent Literature 1, for example).

Moreover, in a system having a secondary battery and a heat pump equipped with a water storage tank, a configuration has been disclosed in which the secondary battery is heated by supplying the battery with heat of hot water of intermediate temperatures in the storage tank when the temperature of the secondary battery is lower than a predetermined temperature (Patent Literature 2, for example).

In Patent Literature 1, the heat comes from the heat pump is used to heat the secondary battery. The configuration described above improves charge-discharge efficiency of the secondary battery; however, efficiency of the heat pump is adversely reduced.

Moreover, even with the configuration disclosed in Patent Literature 2, the efficiency of the secondary battery is improved at the cost of the efficiency of the heat pump.

CITATION LIST

Patent Literature

Patent Literature 1: Japanese Patent Unexamined Publication No. H8-138761
Patent Literature 2: Japanese Patent Unexamined Publication No. 2010-007953

SUMMARY OF THE INVENTION

The present invention provides a hot water storage type hot water supply system and an operation method of the system, in which temperature of a secondary battery is efficiently adjusted without a decrease in efficiency of a heat pump.

The hot water storage type hot water supply system according to the invention includes: a storage battery unit, a heat pump cycle, a water storage tank, a first heat exchanger, a water circulation path, a second heat exchanger, a first path, a second path, a first temperature sensor, a second temperature sensor, and a controller. The heat pump cycle includes: a compressor, a radiator to heat water, an expansion valve, and an evaporator. The heat pump cycle circulates a first refrigerant through the compressor, the radiator, the expansion valve, and the evaporator in this order. The water storage tank stores water that has been heated by the radiator; the stored water is available to be supplied to external loads. The water circulation path is such that the water stored in the water storage tank is circulated from the tank through the first heat exchanger and the radiator in this order, and then returned to the water storage tank. The first path is such that a second refrigerant is circulated through the second heat exchanger and the evaporator in this order. The second path, which becomes usable by switching from the first path to the second path, is one in which the second refrigerant is circulated through the first heat exchanger and the second heat exchanger in this order. The first temperature sensor senses temperature of the storage battery unit. The second temperature sensor senses temperature of the water stored in the water storage tank. The controller switches between the paths through which the second refrigerant is circulated. The evaporator cools air and the second refrigerant. The first heat exchanger performs a heat exchange between the water and the second refrigerant. The second heat exchanger performs a heat exchange between the storage battery unit and the second refrigerant. The controller controls the second refrigerant to flow in the first path when the temperature of the storage battery unit is sensed by the first temperature sensor to be higher than a first predetermined temperature. And, the controller controls the second refrigerant to flow in the second path when the temperature of the storage battery unit is sensed by the first temperature sensor to be lower than a second predetermined temperature. Moreover, the controller controls to close the first and second paths when the temperature of the storage battery unit sensed by the first temperature sensor is not lower than the second predetermined temperature and not higher than the first predetermined temperature.

Moreover, a hot water storage type hot water supply system, for which the operation method according to the invention is used, includes: a storage battery unit, a heat pump cycle, a water storage tank, a first heat exchanger, a water circulation path, a second heat exchanger, a first path, a second path, a first temperature sensor, a second temperature sensor, and a controller. The heat pump cycle includes: a compressor, a radiator to heat water, an expansion valve, and an evaporator. The heat pump cycle circulates a first refrigerant through the compressor, the radiator, the expansion valve, and the evaporator in this order. The water storage tank stores water that has been heated by the radiator; the stored water is available to be supplied to external loads. The water circulation path is such that the water stored in the water storage tank is circulated from the tank through the first heat exchanger and the radiator in this order, and then returned to the water storage tank. The first path is such that a second refrigerant is circulated through the second heat exchanger and the evaporator in this order. The second path, which becomes usable by switching from the first path to the second path, is one in which the second refrigerant is circulated through the first heat exchanger and the second heat exchanger in this order. The evaporator cools air and the second refrigerant. The first heat exchanger performs a heat exchange between the water and the second refrigerant. The second heat exchanger performs a heat exchange between the storage battery unit and the second refrigerant.

The operation method of the system described above is such that, when the temperature of the storage battery unit is higher than the first predetermined temperature, the storage battery unit is cooled through the heat exchange with the second refrigerant flowing in the first path, using the second heat exchanger. When the temperature of the storage battery unit is lower than the second predetermined temperature, the storage battery unit is heated through a heat exchange with the second refrigerant flowing in the second path, using a third heat exchanger.

Note that flows of the refrigerant flowing in the first and second paths may be controlled in such a way that the first and second paths are configured as independent paths and a pump provided to each the path is controlled by the controller.

Use of the hot water storage type hot water supply system and the operation method thereof in accordance with the present invention makes it possible to always adjust the temperature of the storage battery unit to an optimal temperature and to improve the efficiency of the heat pump cycle as well.

DESCRIPTION OF EMBODIMENTS

Figure 1:
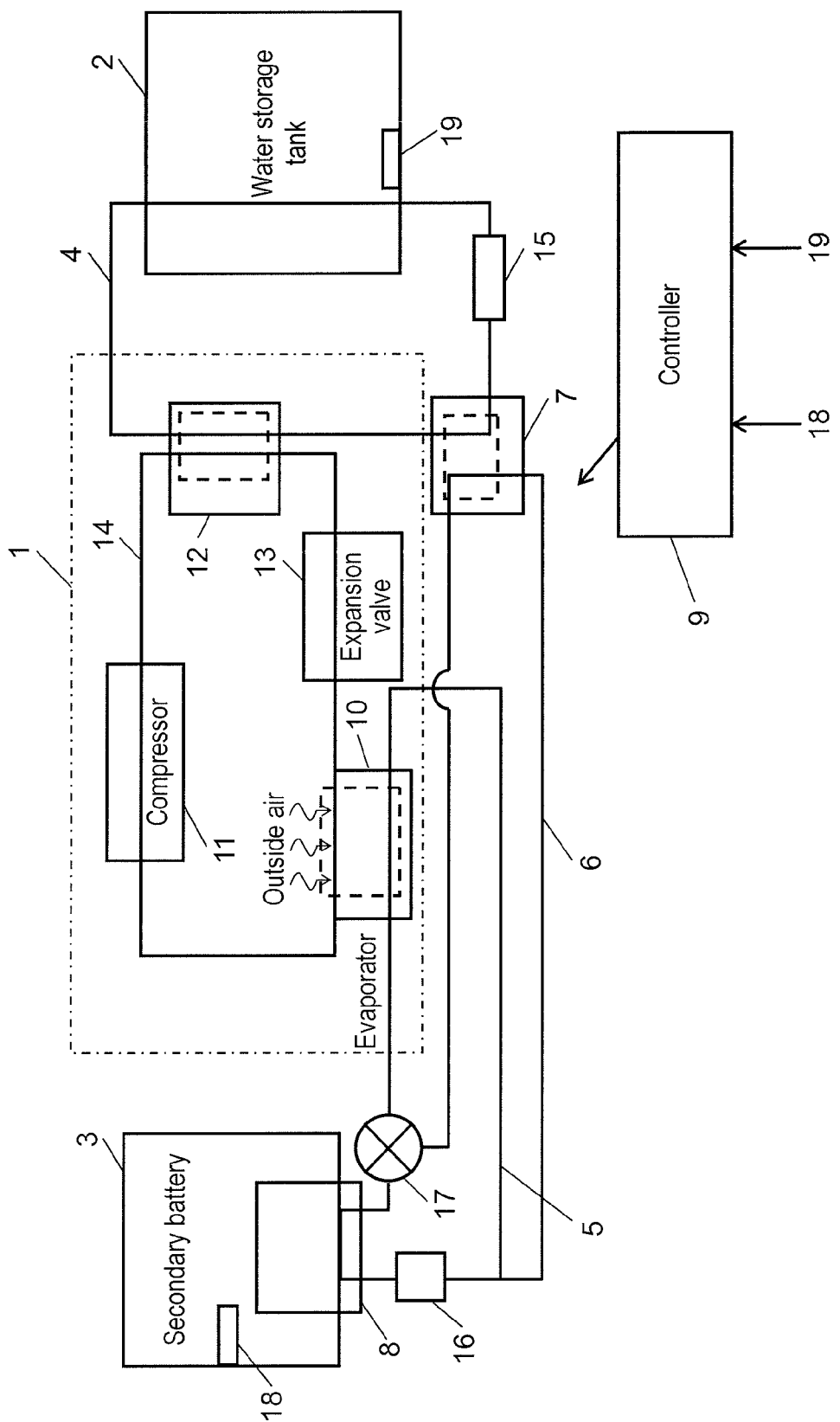
FIG. 1 is a diagrammatic view of a hot water storage type hot water supply system according to an embodiment of the present invention.

A basic configuration of a hot water storage type hot water supply system according to an embodiment of the present invention will be described with reference to FIG. 1. FIG. 1 is a diagrammatic view of the hot water storage type hot water supply system according to the embodiment.

The hot water storage type hot water supply system includes: heat pump cycle 1, water storage tank 2, secondary battery 3 that is a storage battery unit, water circulation path 4, first path 5, second path 6, first heat exchanger 7, second heat exchanger 8, and controller 9.

The heat pump cycle 1 includes: evaporator 10, compressor 11, radiator 12, expansion valve 13, and piping 14 that couples these parts in this order. In piping 14, a working medium (a first refrigerant, not shown) is enclosed. The working medium employs water, hydrocarbon, ammonia, or alternative chlorofluorocarbon, for example.

Water in water storage tank 2 flows out from an outflow port (not shown) at a lower portion of water storage tank 2 into water circulation path 4, flows through first heat exchanger 7 and radiator 12 in this order, and then flows into water storage tank 2 from an inflow port (not shown) at an upper portion of water storage tank 2. That is, in water circulation path 4, first heat exchanger 7 is located upstream relative to radiator 12. Moreover, in water circulation path 4, pump 15 is disposed to circulate the water.

In first path 5 and second path 6, a refrigerant (a second refrigerant) is enclosed. The second refrigerant employs, for example, water, hydrocarbon, ammonia, or alternative chlorofluorocarbon, in a similar way to the working medium (the first refrigerant). In first path 5, the refrigerant (the second refrigerant) circulates through second heat exchanger 8 and evaporator 10 in this order, with the exchanger performing heat exchange with secondary battery 3, In first path 5, pump 16 is disposed to circulate the refrigerant (the second refrigerant).

Moreover, second path 6 is formed and branched off from first path 5 via switching-valve 17; second path 6 becomes usable by switching from first path 5 to the second path 6. In second path 6, the refrigerant (the second refrigerant) is configured to circulate from switching-valve 17 through first heat exchanger 7 and second heat exchanger 8 to original switching-valve 17.

In secondary battery 3, first temperature sensor 18 is disposed. Temperature information sensed by first temperature sensor 18 is inputted to controller 9.

In water storage tank 2, second temperature sensor 19 is disposed. Temperature information sensed by second temperature sensor 19 is inputted to controller 9.

Note that second temperature sensor 19 is preferably disposed at a lower interior portion of water storage tank 2. This allows measurements of temperature of the water flowing from water storage tank 2 into water circulation path 4, resulting in more accurate measurements of the temperature of the water that flows into first heat exchanger 7.

Here, a basic operation of heat pump cycle 1 is described.

First, in evaporator 10, the working medium deprives outside air of heat to form a low temperature and pressure gas. Evaporator 10 not only deprives the outside air of the heat but also obtains heat from the second refrigerant flowing in first path 5 so as to evaporate the working medium. Note that heat sources supplying heat to evaporator 10 are not limited particularly to such outside air and the second refrigerant. For example, liquids such as water and exhaust gases or the like can also be used.

Next, in compressor 11, the working medium is compressed to high temperatures and pressures.

Then, in radiator 12, the heat of the working medium is released through a heat exchange with such as water, air, and refrigerants of the outside of the cycle. In the embodiment, radiator 12 performs the heat exchange between the working medium flowing in piping 14 and the water flowing in water circulation path 4 so as to heat the water.

Finally, in expansion valve 13, the high-pressure working medium undergoes depressurization to return to a low temperature and pressure liquid.

As described above, in water storage tank 2, the water heated by the heat supplied from heat pump cycle 1 is stored. A heat exchange between heat pump cycle 1 and the water in water storage tank 2 is performed as follows.

The water in water storage tank 2 circulates in water circulation path 4 coupled with water storage tank 2. Water circulation path 4 is configured such that the water flows out from the lower portion of water storage tank 2 and flows in from the upper portion of water storage tank 2. In radiator 12 of heat pump cycle 1, the water flowing in water circulation path 4 undergoes the heat exchange with the working medium (the first refrigerant). This supplies the heat, via radiator 12, from the working medium (the first refrigerant) to the water of relatively low temperatures that flows out from the lower portion of water storage tank 2. Then the water of high temperatures, thus heated by the supplied heat, flows into the upper portion of water storage tank 2 from water circulation path 4.

The thus-heated water in water storage tank 2 is supplied to external loads including a hot-water supply and heating, for example.

Secondary battery 3 serving as a storage battery unit is charged with power from system electric power at night. Besides the system electric power, a power generator using natural energies (a solar cell, for example) or a fuel cell may also be employed for power charging. The power stored in secondary battery 3 is utilized to operate compressor 11 of heat pump cycle 1, for example. With such a configuration, cheap nighttime power can be utilized to operate heat pump cycle 1. Besides this, the power stored in secondary battery 3 can be used for a wide range of electricity-consuming apparatus including a household refrigerator and a TV receiver, for example.

Figure 2:
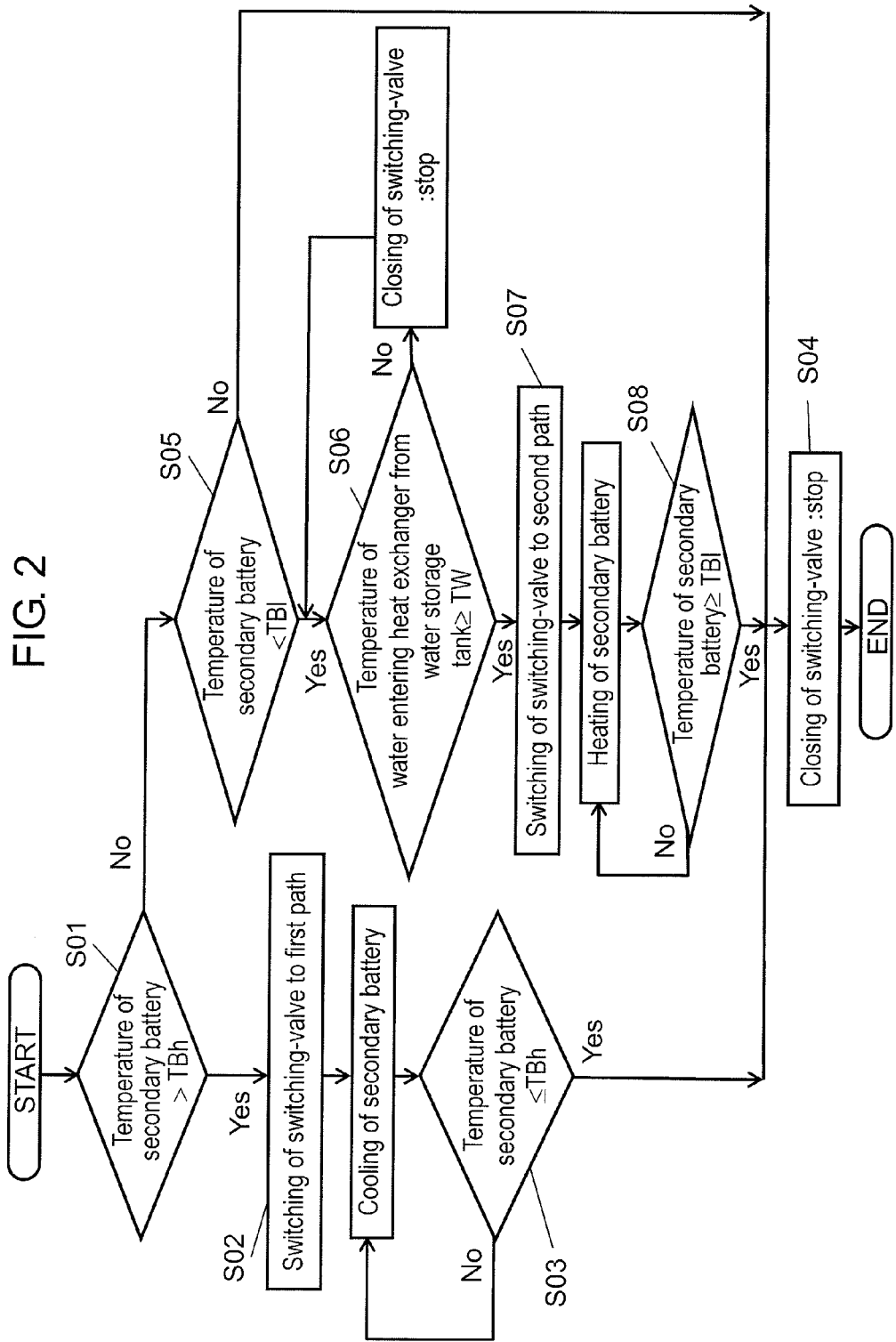
FIG. 2 is a flow-chart of controlling the hot water storage type hot water supply system according to the embodiment of the invention.

Next, with reference to FIG. 2, details of a method of adjusting temperature of secondary battery 3 according to the embodiment will be described. FIG. 2 is a flow-chart of a control processing performed, every predetermined period of time, by controller 9 of the hot water storage type hot water supply system according to the embodiment.

In this system, secondary battery 3 is configured to be capable of performing the heat exchange with the refrigerant (the second refrigerant) flowing in first path 5 and the second path 6, via second heat exchanger 8. Secondary battery 3 generally shows a large variation in charge-discharge performance depending on temperature. For example, a commonly-used lithium-ion secondary battery shows temperature characteristics that exhibit: a small discharge-charge loss and a small degradation of the battery at ordinary temperature (approximately 25° C.); an increased degradation with increasing temperature from the ordinary temperature to higher temperatures; and an increased discharge-charge loss and an increased degradation with decreasing temperature from the ordinary temperature. In the system according to the embodiment, controller 9 holds secondary battery 3 in an optimal range of temperature by switching between the paths in which second refrigerant circulates.

When secondary battery 3 is operated at an optimal temperature (approximately 25° C.), switching-valve 17 is closed such that the refrigerant flows in neither first path 5 nor second path 6.

First, when controller 9 starts the control processing (START in FIG. 2), a judgment is made whether or not the temperature of secondary battery 3 sensed by first temperature sensor 18 is higher than predetermined temperature TBh (a first predetermined temperature) (Step S01). Where TBh is an upper limit of the optimal temperature for operating secondary battery 3, and is set to 35° C., for example. In the case where the temperature of secondary battery 3 is higher than TBh (Yes in Step S01), controller 9 switches switching-valve 17 toward first path 5 (Step S02). This allows the refrigerant (the second refrigerant) to circulate in first path 5. Then, in evaporator 10, the heat exchange is performed between the refrigerant (the second refrigerant) flowing in first path 5 and the working medium (the first refrigerant) flowing in piping 14. Moreover, in second heat exchanger 8, the heat exchange is performed between secondary battery 3 and the refrigerant (the second refrigerant) flowing in first path 5. As a result, the heat held by secondary battery 3 travels to the working medium (the first refrigerant). Therefore, secondary battery 3 is cooled by providing the heat held by itself for the working medium (the first refrigerant). Meanwhile, evaporator 10 causes the working medium to evaporate by utilizing the heat obtained from secondary battery 3. Controller 9 continues to perform this control until the temperature of secondary battery 3 sensed by temperature sensor 18 decreases to not higher than TBh (Step S03). In the case where the temperature of secondary battery 3 decreases to not higher than TBh (Yes in Step S03), the controller closes switching-valve 17 (Step S04).

On the other hand, in the case where the temperature of secondary battery 3 is not higher than TBh (No in Step S01), a judgment is made whether or not the temperature of secondary battery 3 is lower than predetermined temperature TB1 (a second predetermined temperature) (Step S05). Where TB1 is a lower limit of the optimal temperature for operating secondary battery 3, and is set to 10° C., for example. In the case where the temperature of secondary battery 3 is not lower than TB1 (No in Step S05), controller 9 judges that secondary battery 3 is at the optimal temperature. In this situation, if switching-valve 17 is open, controller 9 closes switching-valve 17 (Step S04).

On the other hand, in the case where the temperature of secondary battery 3 is lower than TB1 (Yes in Step S05), controller 9 judges whether or not the temperature of the water in water storage tank 2 sensed by second temperature sensor 19 is not lower than predetermined temperature TW (a third predetermined temperature) (Step S06). In this situation, TW is preferably set to a temperature not lower than TB1 described above, for example, to 20° C. In the case where the temperature sensed by second temperature sensor 19 is not lower than TW (Yes in Step S06), controller 9 switches switching-valve 17 toward second path 6 (Step S07).

This configuration allows the refrigerant (the second refrigerant) to circulate in second path 6. Then, in first heat exchanger 7, a heat exchange is performed between the refrigerant (the second refrigerant) flowing in second path 6 and the water flowing in water circulation path 4. Moreover, in second heat exchanger 8, the heat exchange is performed between secondary battery 3 and the refrigerant (the second refrigerant) flowing in second path 6. The temperature of the water flowing in first heat exchanger 7 is higher than the temperature of secondary battery 3, which thereby allows heat to travel from the water flowing in water circulation path 4 to secondary battery 3. Therefore, secondary battery 3 is heated and adjusted to the optimal temperature. Moreover, the temperature of the water is decreased by providing the heat for secondary battery 3. Accordingly, in radiator 12, the heat exchange with the working medium (the first refrigerant) is performed more efficiently. As a result, it is possible to improve efficiency of heat pump cycle 1. Controller 9 continues to perform this control until the temperature of secondary battery 3 sensed by temperature sensor 18 increases to not lower than TB1 (Step S08). In the case where the temperature of secondary battery 3 increases to not lower than TB1 (Yes in Step S08), the controller closes switching-valve 17 (Step S04).

On the other hand, controller 9 does not switch switching-valve 17 in the case where the temperature of the water in water storage tank 2 is lower than TW (No in Step S06). However, if switching-valve 17 is being opened, controller 9 closes switching-valve 17 (Step S04). After a predetermined period of time during which the heat pump is continuously operated without a halt, controller 9 makes the judgment in Step S06 again. In the case where the temperature of the water in water storage tank 2 increases to not lower than TW (Yes in Step S06), switching-valve 17 is switched toward second path 6 (Step S07) to provide heat for secondary battery 3.

It is possible to adjust the temperature of secondary battery 3 to in the optimal range of temperature through the execution, by controller 9, of the above-described control processing every the predetermined period of time.

Figure 3:
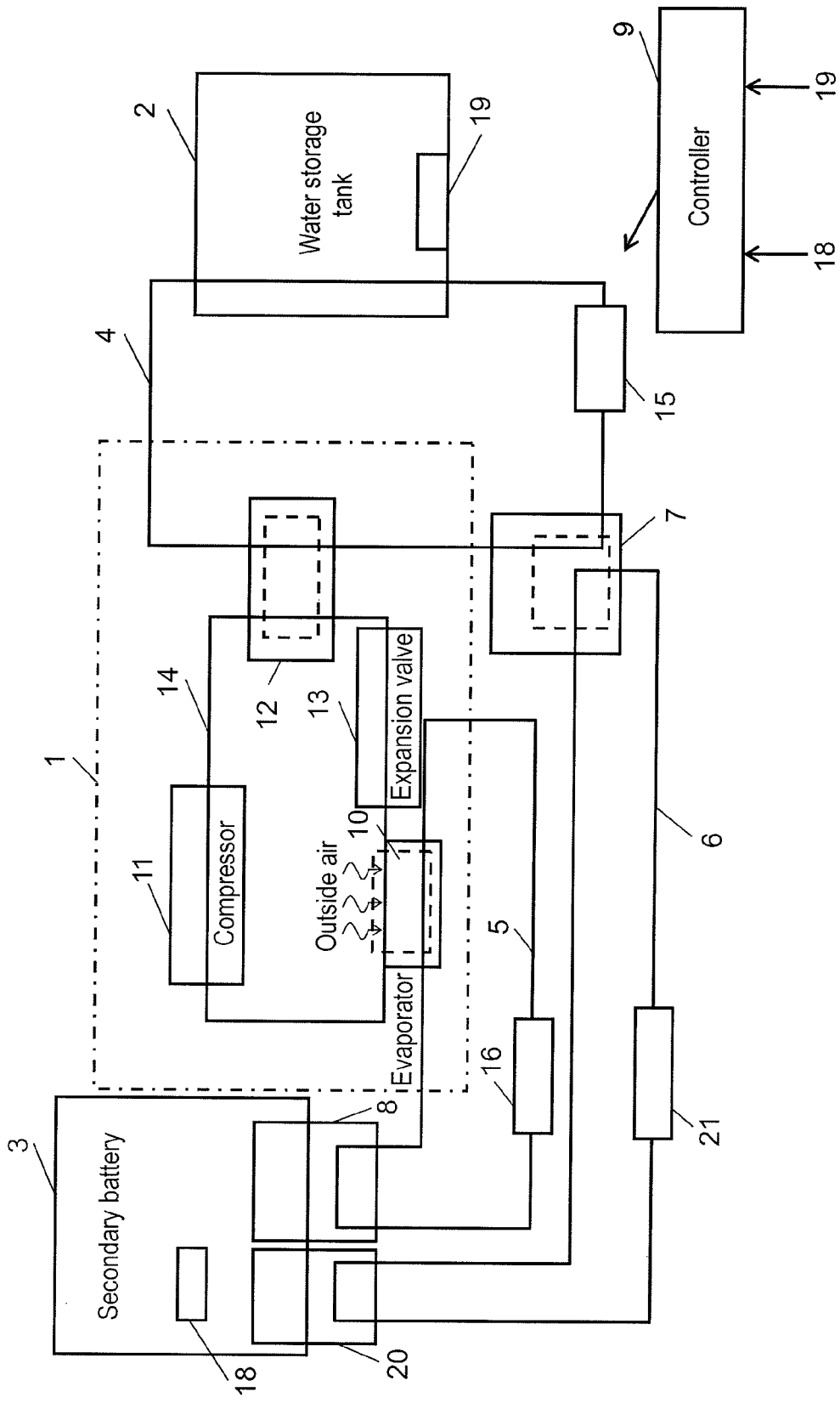
FIG. 3 is a diagrammatic view of another hot water storage type hot water supply system according to the embodiment of the invention.

Next, with reference to FIG. 3, a basic configuration will be described of another hot water storage type hot water supply system according to the embodiment. FIG. 3 is a diagrammatic view of another hot water storage type hot water supply system according to the embodiment. Explanations of configuration and operation the same as those shown in FIGS. 1 and 2 are omitted, but explanations will be made focusing on differences from those in the figures. In this configuration, a difference from FIGS. 1 and 2 is in that first path 5 and second path 6 are each formed as an independent path of one another.

Moreover, in first path 5 and second path 6, refrigerants (the second refrigerant and a third refrigerant, respectively) are enclosed.

In first path 5, pump 16 is disposed to circulate the refrigerant. Like this, in second path 6, pump 21 is disposed to circulate the refrigerant.

Moreover, in first path 5 and second path 6, second heat exchanger 8 and third heat exchanger 20 are disposed, respectively, to perform heat exchanges with secondary battery 3.

Figure 4:
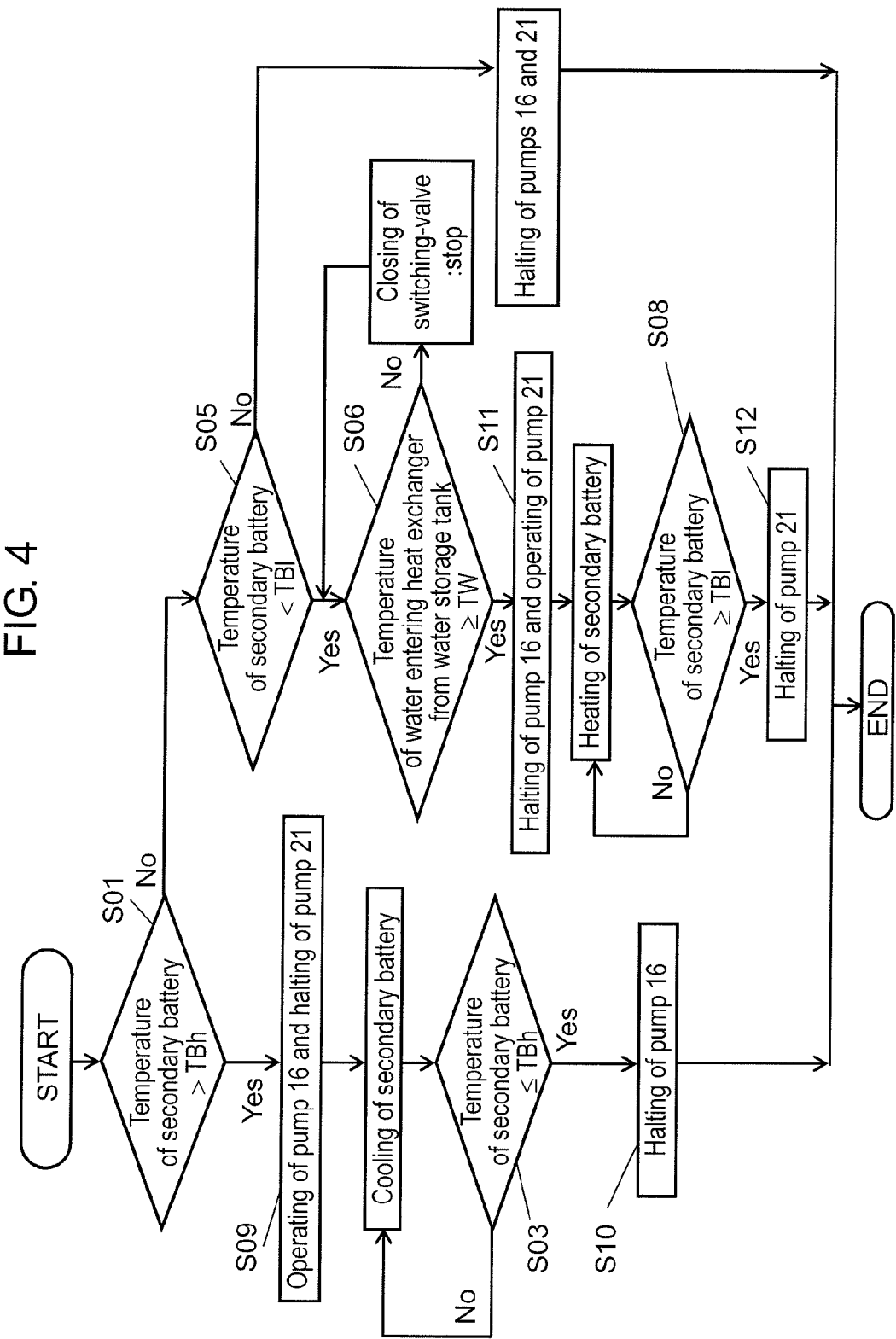
FIG. 4 is a control flow-chart of another hot water storage type hot water supply system according to the embodiment of the invention.

Next, with reference to FIG. 4, details of a method of controlling temperature of secondary battery 3 in the hot water storage type hot water supply system shown in FIG. 3. FIG. 4 is a flow-chart of a control processing performed, every predetermined period of time, by controller 9 of the hot water storage type hot water supply system shown in FIG. 3.

In this system, secondary battery 3 is configured to be capable of performing a heat exchange, via second heat exchanger 8, with the refrigerant (the second refrigerant) flowing in first path 5. Moreover, secondary battery 3 is configured to be capable of performing a heat exchange, via third heat exchanger 20, with the refrigerant (the third refrigerant) flowing in second path 6 formed independently of the first path.

When the temperature of secondary battery 3 serving as a storage battery unit is operated at an optimal temperature (approximately 25° C.), the refrigerants flow in neither first path 5 nor second path 6. This only requires that both pumps 16 and 21 be halted which are disposed in first path 5 and second path 6, respectively.

First, when controller 9 starts the control processing (START in FIG. 4), a judgment is made whether or not the temperature of secondary battery 3 sensed by first temperature sensor 18 is higher than predetermined temperature TBh (a first predetermined temperature) (Step S01). Where TBh is an upper limit of the optimal temperature for operating secondary battery 3, and is set to 35° C., for example. In the case where the temperature of secondary battery 3 is higher than TBh (Yes in Step S01), controller 9 causes pump 16 to work and pump 21 to halt (Step S09). This allows the refrigerant (the second refrigerant) to circulate in first path 5. Then, in evaporator 10, a heat exchange is performed between the refrigerant (the second refrigerant) flowing in first path 5 and the working medium (the first refrigerant) flowing in piping 14. Moreover, in second heat exchanger 8, the heat exchange is performed between secondary battery 3 and the refrigerant (the second refrigerant) flowing in first path 5. As a result, the heat held by secondary battery 3 travels to the working medium (the first refrigerant). Therefore, secondary battery 3 is cooled by providing the heat held by itself for the working medium (the first refrigerant). Meanwhile, evaporator 10 causes the working medium to evaporate by utilizing the heat obtained from secondary battery 3. Controller 9 continues to perform this control until the temperature of secondary battery 3 sensed by temperature sensor 18 decreases to not higher than TBh (Step S03). In the case where the temperature of secondary battery 3 decreases to not higher than TBh (Yes in Step S03), the controller halts the operation of pump 16 (Step S10).

On the other hand, in the case where the temperature of secondary battery 3 is not higher than TBh (No in Step S01), a judgment is made whether or not the temperature of secondary battery 3 is lower than predetermined temperature TB1 (a second predetermined temperature) (Step S05). Where TB1 is a lower limit of the optimal temperature for operating secondary battery 3, and is set to 10° C., for example. In the case where the temperature of secondary battery 3 is not lower than TB1 (No in Step S05), controller 9 judges that secondary battery 3 is at the optimal temperature. In this situation, if pumps 16 and 21 are working, the operation of both the pumps is halted (Step S13).

On the other hand, in the case where the temperature of secondary battery 3 is lower than TB1 (Yes in Step S05), controller 9 judges whether or not the temperature of the water in water storage tank 2 sensed by second temperature sensor 19 is not lower than predetermined temperature TW (a third predetermined temperature) (Step S06). In this situation, TW is preferably set to a temperature not lower than TB1 described above, for example, to 20° C. In the case where the temperature sensed by second temperature sensor 19 is not lower than TW (Yes in Step S06), controller 9 causes the refrigerant in second path 6 to flow, by causing pump 21 to work and pump 16 to halt (Step S11). This configuration allows the refrigerant (the third refrigerant) to circulate in second path 6. Then, in first heat exchanger 7, a heat exchange is performed between the refrigerant (the third refrigerant) flowing in second path 6 and the water flowing in water circulation path 4. Moreover, in third heat exchanger 20, the heat exchange is performed between secondary battery 3 and the refrigerant (the third refrigerant) flowing in second path 6. The temperature of the water flowing into first heat exchanger 7 is higher than the temperature of secondary battery 3, which thereby allows heat to travel from the water flowing in water circulation path 4 to secondary battery 3. Therefore, secondary battery 3 is heated and adjusted to the optimal temperature. Moreover, by transferring the heat from the water to secondary battery 3, the temperature of the water decreases to the optimal temperature described above. Accordingly, in radiator 12, the heat exchange with the working medium (the first refrigerant) is performed more efficiently. As a result, it is possible to improve efficiency of heat pump cycle 1. Controller 9 continues to perform this control until the temperature of secondary battery 3 sensed by temperature sensor 18 increases to not lower than TB1 (Step S08). In the case where the temperature of secondary battery 3 increases to not lower than TB1 (Yes in Step S08), the controller halts the operation of pump 21 (Step S12).

On the other hand, in the case where the temperature of water storage tank 2 is lower than TW (No in Step S06), controller 9 allows neither pumps 16 nor 21 to work. However, if pumps 16 and 21 are working, the controller causes pumps 16 and 21 to halt. And, after a predetermined period of time during which heat pump 1 is continuously operated without a halt, controller 9 makes the judgment in Step S06 again. In the case where the temperature of the water in water storage tank 2 increases to not lower than TW (Yes in Step S06), only pump 21 is allowed to work so as to switch the path to second path 6 (Step S11), thereby providing heat for secondary battery 3.

It is possible to adjust the temperature of secondary battery 3 to in the optimal range of temperature through the execution, by controller 9, of the above-described control processing every the predetermined period of time.

Note that, in this embodiment, the judgment in Step S06 may be omitted. That is, when the temperature of the secondary battery is lower than TB1, the refrigerant in second path 6 may be controlled so as for it to flow, independently of the temperature of the water in water storage tank 2. In many cases, the temperature of the water in water storage tank 2 is not lower than TB1. And, even if this is not the case, the temperature of the water in water storage tank 2 increases due to the operation of the heat pump. Hence, it is possible to sufficiently achieve the advantages of the invention.

As described, the hot water storage type hot water supply system according to the embodiment is such that the temperature of secondary battery 3 serving as a storage battery unit can be controlled to the optimal temperature in such a way as follows. When the temperature of secondary battery 3 is higher or lower than the optimal range of temperature, the path in which the second refrigerant flows is switched over. Or, when the temperature of secondary battery 3 is higher or lower than the optimal range of temperature, the first and second paths independent of one another are switched between them such that with the second and third refrigerants of different temperatures flow in the paths, respectively. With this configuration, it is possible to improve charge-discharge efficiency of secondary battery 3. In addition, the heat generated through heating and cooling of secondary battery 3 can be effectively used in heat pump cycle 1 to improve the efficiency of heat pump cycle 1 as well.

It should be noted that, in this embodiment, although the storage battery unit employs secondary battery 3, the storage battery unit may be configured to employ elements including an electric double-layer capacitor other than secondary battery 3. Moreover, the object to be temperature-controlled is not limited to the storage battery unit. Any of objects which are preferably expected to be adjusted to within a particular range of temperature may be employed as one to be temperature-controlled.

INDUSTRIAL APPLICABILITY

As described above, in the hot water storage type hot water supply system according to the present invention, it is possible to improve the efficiency of the heat pump cycle as well as the charge-discharge efficiency of the storage battery unit, by adjusting the storage battery unit to the optimal temperature. Accordingly, the system is useful for household systems including a hot water storage type heat pump system.

The invention claimed is:

1. A hot water storage type hot water supply system, comprising:
a storage battery unit;
a heat pump cycle including:
a compressor;
a radiator for heating water;
an expansion valve; and
an evaporator, the heat pump cycle circulating a first refrigerant through the compressor, the radiator, the expansion valve, and the evaporator in this order;
a water storage tank for storing the water heated by the radiator;
a first heat exchanger;
a water circulation path for circulating the water in the water storage tank, the water circulation path circulating the water from the water storage tank through the first heat exchanger and the radiator in this order and returning the water again to the water storage tank;
a second heat exchanger;
a first path for circulating a second refrigerant through the second heat exchanger and the evaporator in this order;
a second path for circulating the second refrigerant through the first heat exchanger and the second heat exchanger in this order, the second path being usable by switching from the first path thereto;
a first temperature sensor for sensing temperature of the storage battery unit;
a second temperature sensor for sensing temperature of the water stored in the water storage tank; and
a controller for switching between the paths circulating the second refrigerant,
wherein the evaporator cools the second refrigerant and air, the first heat exchanger performing a heat exchange between the water and the second refrigerant, the second heat exchanger performing a heat exchange between the storage battery unit and the second refrigerant,
the controller controls the second refrigerant to flow in the first path when the temperature of the storage battery unit sensed by the first temperature sensor is higher than a first predetermined temperature TBh,
the controller controls the second refrigerant to flow in the second path when the temperature of the storage battery unit sensed by the first temperature sensor is lower than a second predetermined temperature TB1 lower than the first predetermined temperature TBh, and
the controller controls to close the first path and the second path when the temperature of the storage battery unit sensed by the first temperature sensor is not lower than the second predetermined temperature TB1 and not higher than the first predetermined temperature TBh.

2. The hot water storage type hot water supply system according to claim 1, wherein the controller controls the second refrigerant to flow in the second path when the temperature of the water in the water storage tank sensed by the second temperature sensor is not lower than a third predetermined temperature TW higher than the second predetermined temperature TB1.

3. A hot water storage type hot water supply system, comprising:
a storage battery unit;
a heat pump cycle including:
a compressor;
a radiator for heating water;
an expansion valve; and
an evaporator, the heat pump cycle circulating a first refrigerant through the compressor, the radiator, the expansion valve, and the evaporator in this order;
a water storage tank for storing the water heated by the radiator;
a first heat exchanger;
a water circulation path for circulating the water in the water storage tank through the first heat exchanger and the radiator in this order and returning the water again to the water storage tank;
a second heat exchanger;
a first path for circulating a second refrigerant through the second heat exchanger and the evaporator in this order;
a first pump for circulating the second refrigerant in the first path;
a third heat exchanger;
a second path for circulating a third refrigerant through the first heat exchanger and the third heat exchanger in this order;
a second pump for circulating the third refrigerant in the second path;
a first temperature sensor for sensing temperature of the storage battery unit;
a second temperature sensor for sensing temperature of the water stored in the water storage tank; and
a controller for operating and halting the first pump and the second pump,
wherein the evaporator cools the second refrigerant and air, the first heat exchanger performing a heat exchange between the water and the third refrigerant, the second heat exchanger performing a heat exchange between the storage battery unit and the second refrigerant, the third heat exchanger performing a heat exchange between the storage battery unit and the third refrigerant, the controller controls to operate the first pump and to halt the second pump when the temperature of the storage battery unit sensed by the first temperature sensor is higher than a first predetermined temperature TBh, the controller controls to operate the second pump and to halt the first pump when the temperature of the storage battery unit sensed by the first temperature sensor is lower than a second predetermined temperature TB1 lower than the first predetermined temperature TBh, and the controller controls to halt the second pump and the first pump when the temperature of the storage battery unit sensed by the first temperature sensor is not lower than the second predetermined temperature TB1 and not higher than the first predetermined temperature TBh.

4. The hot water storage type hot water supply system according to claim 3, wherein the controller controls to operate the second pump and to halt the first pump when the temperature of the water in the water storage tank sensed by the second temperature sensor is not lower than a third predetermined temperature TW higher than the second predetermined temperature TB1.

5. A method of operating a hot water storage type hot water supply system, the system including:
   a storage battery unit;
   a heat pump cycle having:
      a compressor;
      a radiator for heating water;
      an expansion valve; and
      an evaporator, the heat pump cycle circulating a first refrigerant through the compressor, the radiator, the expansion valve, and the evaporator in this order;
   a water storage tank for storing the water heated by the radiator;
   a first heat exchanger;
   a water circulation path for circulating the water in the water storage tank, the water circulation path circulating the water from the water storage tank through the first heat exchanger and the radiator in this order and returning the water again to the water storage tank;
   a second heat exchanger;
   a first path for circulating a second refrigerant through the second heat exchanger and the evaporator in this order; and
   a second path for circulating the second refrigerant through the first heat exchanger and the second heat exchanger in this order, the second path being usable by switching from the first path thereto, wherein the evaporator cools the second refrigerant and air, the first heat exchanger performs a heat exchange between the water and the second refrigerant, the second heat exchanger performing a heat exchange between the storage battery unit and the second refrigerant, the method comprising the steps of:
cooling the storage storage battery unit by the second heat exchanger through the heat exchange with the second refrigerant flowing in the first path when the temperature of the storage battery unit is higher than a first predetermined temperature TBh, and heating the storage battery unit by the second heat exchanger through the heat exchange with the second refrigerant flowing in the second path when the temperature of the storage battery unit is lower than a second predetermined temperature TB1 lower than the first predetermined temperature TBh.

6. The method of operating a hot water storage type hot water supply system according to claim 5, wherein, when the second heat exchanger performs the heat exchange between the storage battery unit and the second refrigerant, the first heat exchanger performs the heat exchange between the second refrigerant and the water of a temperature not lower than a third predetermined temperature TW higher than the second predetermined temperature TB1.

7. A method of operating a hot water storage type hot water supply system, the system including:
   a storage battery unit;
   a heat pump cycle including:
      a compressor;
      a radiator for heating water;
      an expansion valve; and
      an evaporator, the heat pump cycle circulating a first refrigerant through the compressor, the radiator, the expansion valve, and the evaporator in this order;
   a water storage tank for storing the water heated by the radiator;
   a first heat exchanger;
   a water circulation path for circulating the water in the water storage tank through the first heat exchanger and the radiator in this order and returning the water again to the water storage tank;
   a second heat exchanger;
   a first path for circulating a second refrigerant through the second heat exchanger and the evaporator in this order;
   a first pump for circulating the second refrigerant in the first path;
   a third heat exchanger;
   a second path for circulating a third refrigerant through the first heat exchanger and the third heat exchanger in this order; and
   a second pump for circulating the third refrigerant in the second path, wherein the evaporator cools the second refrigerant and air, the first heat exchanger performing a heat exchange between the water and the third refrigerant, the second heat exchanger performs a heat exchange between the storage battery unit and the second refrigerant, the third heat exchanger performing a heat exchange between the storage battery unit and the third refrigerant, the method comprising the steps of:
cooling the storage battery unit by the second heat exchanger through the heat exchange with the second refrigerant flowing in the first path when the temperature of the storage battery unit is higher than a first predetermined temperature TBh, and heating the storage battery unit by the third heat exchanger through the heat exchange with the third refrigerant flowing in the second path when the temperature of the storage battery unit is lower than a second predetermined temperature TB1 lower than the first predetermined temperature.

8. The method of operating a hot water storage type hot water supply system according to claim 7, wherein, when the third heat exchanger performs the heat exchange between the storage battery unit and the third refrigerant, the first heat exchanger performs the heat exchange between the third refrigerant and the water of a temperature not lower than a third predetermined temperature TW higher than the second predetermined temperature TB1.

* * * * *